US006471220B1

(12) United States Patent
Babb

(10) Patent No.: US 6,471,220 B1
(45) Date of Patent: Oct. 29, 2002

(54) CART AND STAND FOR SUPPORTING AND TRANSPORTING METAL WORKING APPARATUS

(75) Inventor: Larry F. Babb, Grafton, OH (US)

(73) Assignee: Emerson Electric Co., St. Louis, MO (US)

(*) Notice: Subject to any disclaimer, the term of this patent is extended or adjusted under 35 U.S.C. 154(b) by 65 days.

(21) Appl. No.: 09/592,718

(22) Filed: Jun. 13, 2000

(51) Int. Cl.[7] .................................... B62B 1/04

(52) U.S. Cl. ...................... 280/30; 280/40; 280/47.131; 280/47.14

(58) Field of Search ........................ 280/30, 32, 652, 280/655, 43.14, 43.24, 47.18, 47.33, 47.131, 40; 414/490

(56) References Cited

U.S. PATENT DOCUMENTS 1,255,484 A 2/1918 Stephens
2,831,583 A 4/1958 Wright et al.
3,095,592 A 7/1963 Hunt
3,134,119 A 5/1964 Criscuolo
3,826,513 A 7/1974 Wolf
3,863,945 A 2/1975 Dunstan
3,883,150 A 5/1975 Varela
3,937,485 A 2/1976 Shourek et al.
3,942,217 A 3/1976 Bates
3,954,155 A * 5/1976 Guidara ....................... 182/20
4,209,274 A 6/1980 Martin et al.
4,269,096 A * 5/1981 Boone ....................... 83/477.2
4,348,034 A * 9/1982 Welt ............................ 280/35
4,611,823 A 9/1986 Haas
5,087,013 A 2/1992 Gress et al.
5,484,154 A * 1/1996 Ward .......................... 280/652
5,718,440 A 2/1998 Roxbury
5,863,052 A * 1/1999 Roman ........................ 280/30
6,068,355 A * 5/2000 Thorp ........................ 312/241
6,093,117 A * 7/2000 Sherlock et al. ............ 473/422
6,186,134 B1 * 2/2001 Battersby et al. ............. 124/78

FOREIGN PATENT DOCUMENTS

GB 2 051 690 1/1981

OTHER PUBLICATIONS

RIDGID Catalog No. RT–199, p. 32, published Jan. 1999.

* cited by examiner

*Primary Examiner*—Robert P. Olszewski
*Assistant Examiner*—James S. McClellan
(74) *Attorney, Agent, or Firm*—Fay, Sharpe, Fagan, Minnich & McKee

(57) ABSTRACT

A combined cart and stand comprising a base for supporting a power driven threading machine and having a pair of wheels for supporting the base and machine for rolling movement along an underlying surface. Three legs are interconnected with the base for displacement between first and second positions relative to the base, and, in the first position, the legs and base provide a tripod stand engaging an underlying surface to support the base and machine in a use position spaced above the underlying surface. In the second position, two of the legs provide handles and the third leg is folded and stored relative to the base providing a cart having wheels which engage the underlying surface such that the base and machine can be inclined relative to the surface and supported by the wheels for rolling movement therealong.

43 Claims, 11 Drawing Sheets

CART AND STAND FOR SUPPORTING AND TRANSPORTING METAL WORKING APPARATUS

BACKGROUND OF THE INVENTION

This invention relates to the art of stands and carts for supporting and transporting metal working apparatus and, more particularly, to a device selectively convertible between stand and cart configurations for the latter purpose.

While the present invention finds particular utility in connection with supporting and transporting a power driven threading machine and accordingly will be described in detail in connection therewith, it will be appreciated that the invention is applicable to the supporting and transporting of other metal working machines, such as roll grooving machines as well as machines and devices other than metal working machines.

Collapsible tripod type stands have been provided heretofore for a threading machine as shown for example in U.S. Pat. No. 4,209,274 to Martin, et al. In the latter disclosure, one leg of the tripod is defined in part by a power drive unit for the threading machine, and the other two legs are foldable relative to the one leg between one position in which the three legs and machine are in a tripod configuration and a second position in which the other two legs lie generally parallel to the one leg to facilitate transporting the machine and stand. In this instance, the machine and stand are bodily carried.

Another stand and transporting arrangement for a metal working machine is shown in U.S. Pat. No. 5,718,440 to Roxbury wherein a pipe cutting machine is supported on a tripod stand having foldable legs. The machine is adapted to removably receive a wheeled transportation dolly having support arms interengaged with the chuck and body of the machine. The stand and dolly are manipulated for the wheels to engage an underlying surface, and the legs are folded together so that the stand and machine can be rolled along the underlying surface. A similar stand and transporter assembly is available from The Ridge Tool Company of Elyria, Ohio under the latter's product designations No. 1206 Stand and No. 32 Transporter. The Stand is a tripod-type stand for supporting a power driven threading machine and has foldable legs for collapsing the stand, and the Transporter comprises an axle bar having wheels on the opposite ends thereof and a mounting bar intermediate the opposite ends and transverse to the axis of the bar. The mounting bar is adapted to be removably received in the chuck jaws of the threading machine, whereby the latter can be supported on an underlying surface by the wheels and moved therealong using the collapsed legs of the stand as a handle unit. The foldable stand is structurally similar to the vise stand shown in U.S. Pat. No. 2,831,583 to Wright, et al.

While stands of the foregoing character serve their intended purpose, they are cumbersome to use and the use thereof is time-consuming with respect to the conversion between the transporter and stand configurations thereof. With regard to the arrangement shown in the Martin, et al. patent, for example, either two people must work together to support the machine and fold the legs, or the user must pivot the unit about two of the legs to position the machine on an underlying surface and then collapse the legs relative to one another. In either event, the machine and stand must be physically lifted and carried from one point of use to another. To erect the machine into the use position thereof, either one person must hold the machine while another unfolds the legs, or the user must unfold the legs to the tripod configuration with the machine on the ground and then physically lift the machine upwardly about the lower ends of two of the legs to the use position. The Ridge Tool Stand and the stand shown in Wright, et al. are also cumbersome to use in that a base component must be lifted and a tray between the legs and defined by articulated plate components must be collapsed upwardly or unfolded downwardly in respectively collapsing and erecting the stand.

While the Roxbury and Ridge Tool Transporter arrangements provide for wheeled transportation of a machine and stand from one location to another, manipulation of the assembly from the transporter to the stand or use position still requires unfolding of the legs of the stand to the tripod configuration thereof and then physically lifting the machine upwardly about the lower ends of two of the legs to reach the use position. Alternatively, the machine can be removed from the stand and remounted thereon after the stand is erected. This is of course very time-consuming and cumbersome. Furthermore, the latter wheeled arrangements require removal of the wheel assembly from the machine before use thereof and, if the latter is a threading machine, mounting or repositioning of the support bars for the die head and mounting of the threading die head thereon. It will be appreciated too that in the latter situation the die head must be transported separately from the threading machine. When it is desired to convert the Roxbury or Ridge Tool stand to the transporter configuration, the die head must be removed, the support rods removed or repositioned and the wheel unit mounted on the machine, and the user must then lower the machine to the underlying surface by pivoting the stand and machine about two of the legs until the wheels engage the underlying surface. Thereafter, the legs of the stand are folded inwardly relative to one another to provide a handle for transporting the wheeled stand. Moreover, the folded legs have to be interengaged with one another such as by a chain wrapped around the legs so as to stabilize the legs against separation from one another during pushing or pulling of the stand.

SUMMARY OF THE INVENTION

In accordance with the present invention, a combination cart and stand is provided which minimizes or overcomes the foregoing and other disadvantages of the stands and/or stand and cart combinations heretofore available. In particular in this respect, a cart and stand in accordance with the present invention minimizes the physical work required by a user in lifting and lowering the metal working apparatus mounted thereon in converting from the cart to the stand configuration and vice versa. Moreover, a cart and stand in accordance with the present invention advantageously allows the transporting of a threading machine with the threading die head carriage and support bars in place thereon and enables the conversion between the cart and stand configurations without having to remove or remount the carriage or the support bars therefor on the threading machine. A cart and stand according to the invention comprises a wheeled base and three legs which, in the stand configuration, form a tripod by which a threading machine or other metal working apparatus is supported in a use position spaced above an underlying surface. The foregoing advantages over existing tripod-type stands are achieved in part by providing for one of the legs to be comprised of leg members interconnected for relative displacement between extended and collapsed positions relative to one another and, when in the collapsed position, to be stored relative to the base. The collapsing capability with regard to the one leg allows a user to raise or lower the threading machine relative to the underlying surface in converting between the stand and cart configurations quicker and with less physical effort on the part of the user than is required in connection with initially displacing the prior art wheeled stands between the transporting and use configurations thereof. In particular in this respect, all three legs in the prior art stands are of one piece construction and are rigidly associated with the base portion of the stand when the stand is raised or lowered relative to the underlying surface. Preferably, the leg components of the collapsible leg are biased between the extended and collapsed positions such as by an air spring to further assist a user in lifting and lowering the machine on the base in converting the cart and stand between the two configurations thereof. Preferably, the other two legs in the cart configuration are oriented relative to the base so as to be parallel to one another to provide a pair of spaced apart handles by which the cart can be held in an inclined disposition and rolled along an underlying surface from one location to another.

It is accordingly an outstanding object of the present invention to provide an improved combination wheeled cart and stand for supporting and transporting metal working apparatus.

Another object is the provision of a cart and stand of the foregoing character which requires less physical effort on the part of a user in converting from one to the other of the cart and stand configurations thereof.

Yet another object is the provision of a cart and stand of the foregoing character which is selectively convertible between the cart and stand configurations thereof without having to add or remove component parts in order to use the metal working apparatus in the stand configuration and in order to provide wheels for transporting the apparatus in the cart configuration.

Yet another object is the provision of a cart and stand of the foregoing character in which a leg of the cart and stand has components displaceable between extended and collapsed positions to facilitate converting the cart and stand between the two configurations thereof.

Still a further object is the provision of a cart and stand of the foregoing character wherein the components of the one leg are biased between the extended and collapsed positions thereof in a manner which assists a user in elevating and lowering the metal working apparatus in connection with converting between the cart and stand configurations.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
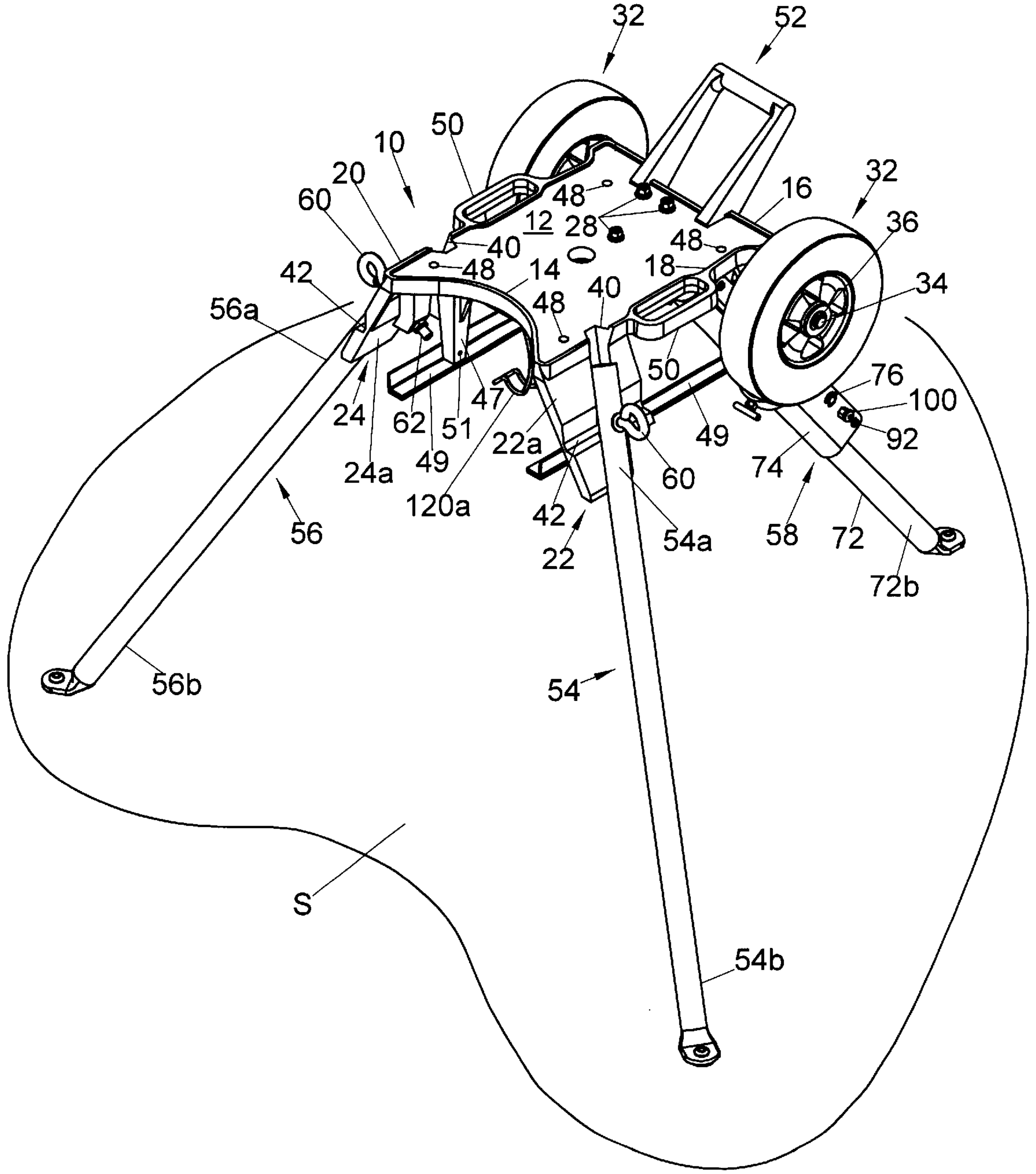
FIG. 1 is a perspective front view of a cart and stand in accordance with the present invention in the stand configuration thereof.
Figure 2:
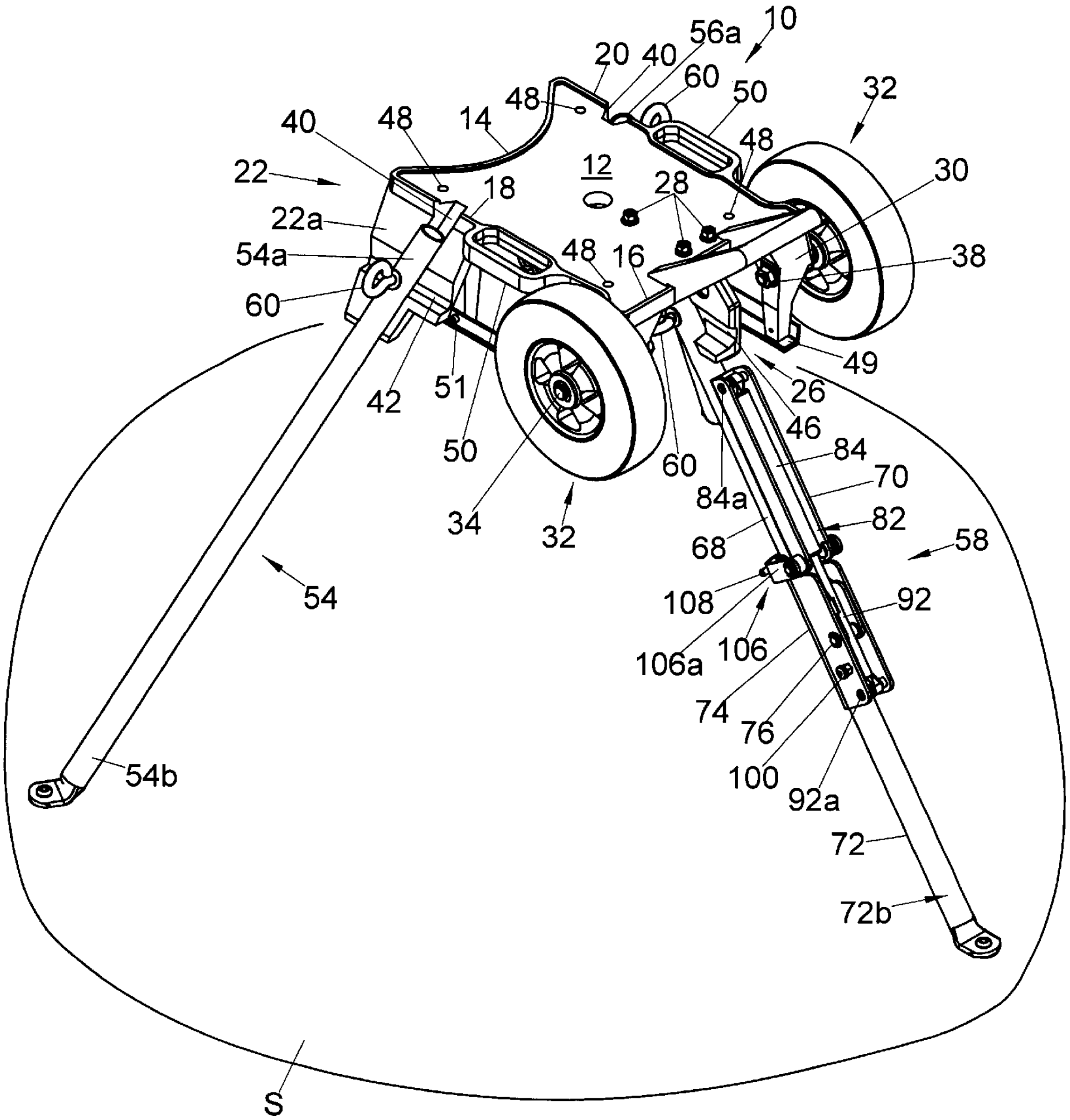
FIG. 2 is a rear perspective view of the cart and stand in the stand configuration.
Figure 3:
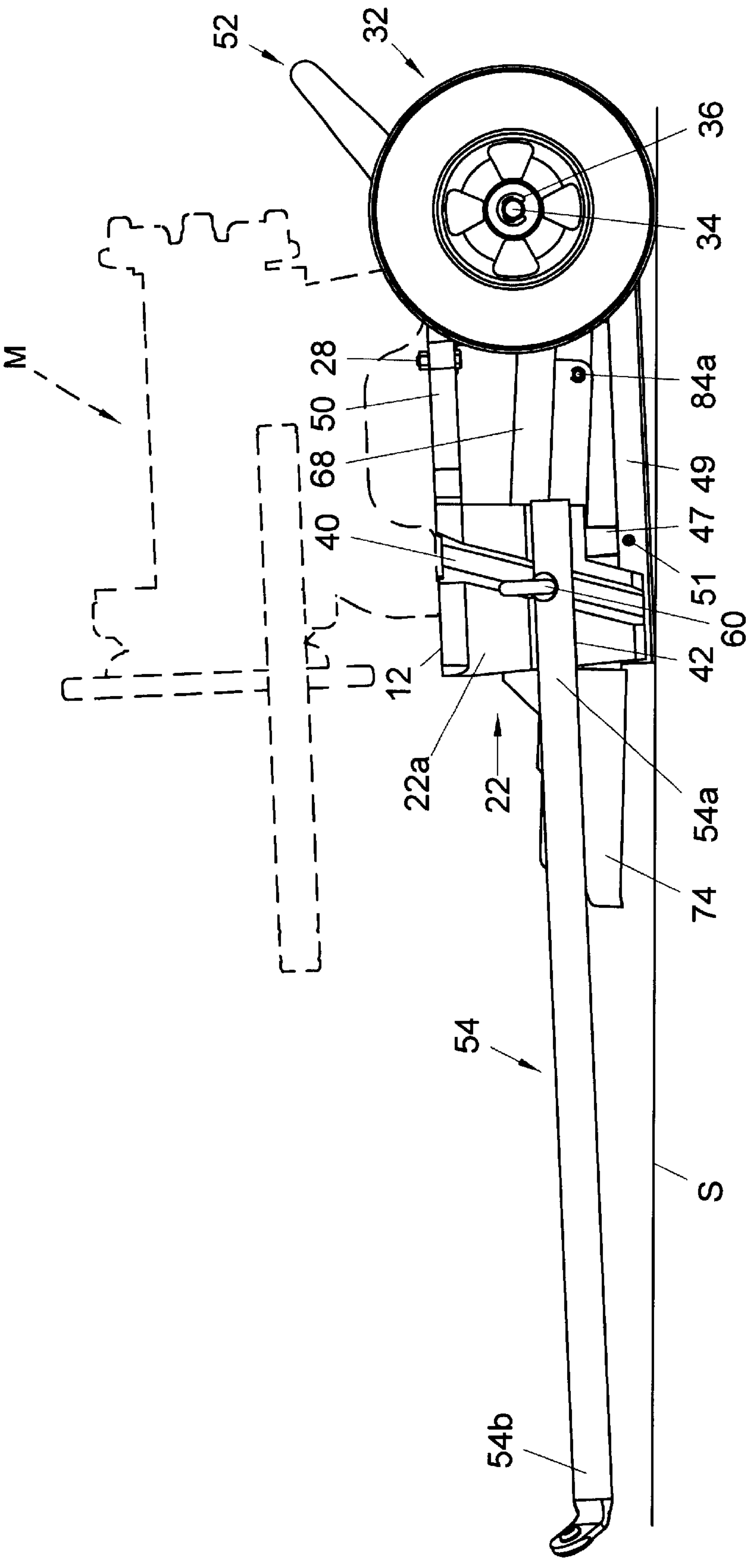
FIG. 3 is a side elevation view of the cart and stand in the cart configuration.

Referring now in greater detail to the drawings wherein the showings are for the purpose of illustrating a preferred embodiment of the invention only and not for the purpose of limiting the invention, a cart and stand in accordance with the present invention, as shown in FIGS. 1–5, includes a base 10 for supporting a metal working machine M such as a pipe threading machine as schematically illustrated in FIG. 3 of the drawing. Base 10 comprises a generally flat plate 12 having front and rear ends 14 and 16, respectively, and laterally opposite sides 18 and 20 between the front and rear ends. Base 10 further includes first and second leg supports 22 and 24 depending respectively from sides 18 and 20 adjacent front end 14 of the plate, and a third leg support 26 adjacent rear end 16 of the plate and depending therefrom generally centrally between sides 18 and 20. Plate 12 and leg supports 22 and 24 are preferably integral and of a suitable cast metal such as aluminum, and leg support 26 is also of cast metal and is mounted on the underside of plate 12 by a plurality of fasteners 28. Base 10 further includes a pair of wheel supports 30 depending from sides 18 and 20 adjacent rear end 16 of plate 12, and a wheel 32 is mounted on each wheel support by means of a corresponding axle 34 for rotation about wheel axes extending transverse to sides 18 and 20 of plate 12. Wheels 32 are retained on the axially outer ends of axles 34 by spring clips 36 and, as will be appreciated from FIG. 2, axles 34 have threaded inner ends extending through openings therefor in the wheel supports, not designated numerically, and the axles and wheels are retained on the wheel supports by nuts 38 on the threaded ends thereof.

First and second leg supports 22 and 24 include corresponding plate portions 22*a* and 24*a* which extend downwardly and laterally outwardly respectively from sides 18 and 20 of plate 12. For the purpose set forth more fully hereinafter, each of the plates 22*a* and 24*a* includes a first recess 40 therein which extends downwardly and is inclined forwardly relative to front end 14 of plate 12 and a second recess 42 which is spaced below and extends parallel to plate 12 and the corresponding one of the sides 18 and 20 thereof and intersects recess 40. The third leg support 26 includes a plate portion 26*a* which is provided with a first recess 44 which extends downwardly and rearwardly with respect to rear end 16 of plate 12 and a second recess 46 which intersects recess 44 and is spaced below and slightly inclined upwardly and forwardly relative to plate 12 and to sides 18 and 20 thereof. Base 10 further includes a pair of skid supports 47 integral with and depending from the underside of plate 12 rearwardly of front end 14 and laterally inwardly of sides of 18 and 20 and, as will be appreciated from FIGS. 1 and 2, a pair of angle iron skid bars 49 are secured to the lower ends of skid supports 47 and wheel supports 30 on the corresponding side of plate 12 by threaded fasteners 51. Finally, plate 12 of base 10 is provided with a plurality of openings 48 therethrough to facilitate the mounting of machine M thereon through the use of suitable fasteners, not shown, and for the purposes set forth hereinafter, sides 18 and 20 of plate 12 are provided with handles 50 and rear end 16 of the plate is provided with a support and handle component 52.

Figure 4:
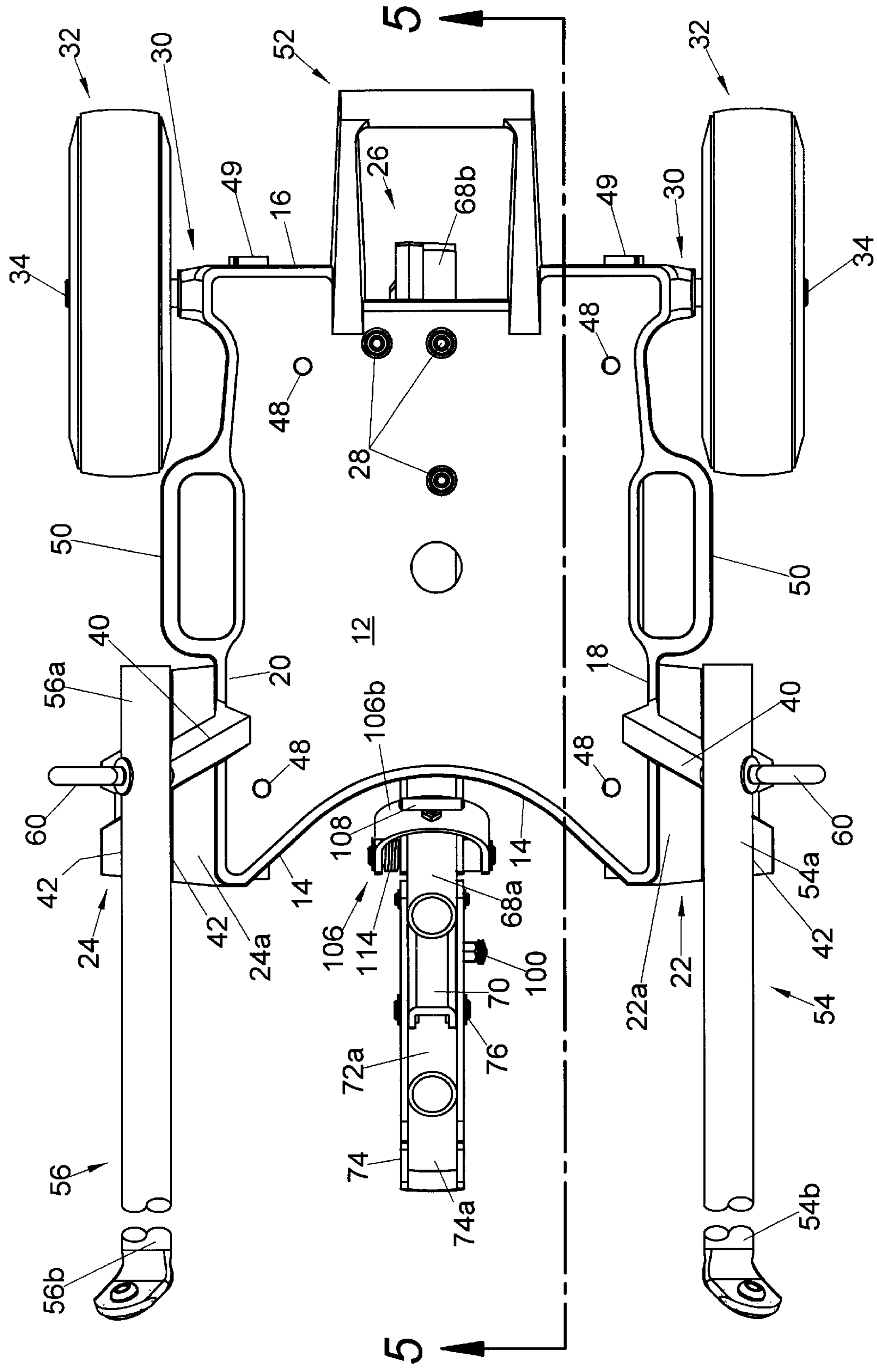
FIG. 4 is a plan view of the cart and stand in the cart configuration.
Figure 5:
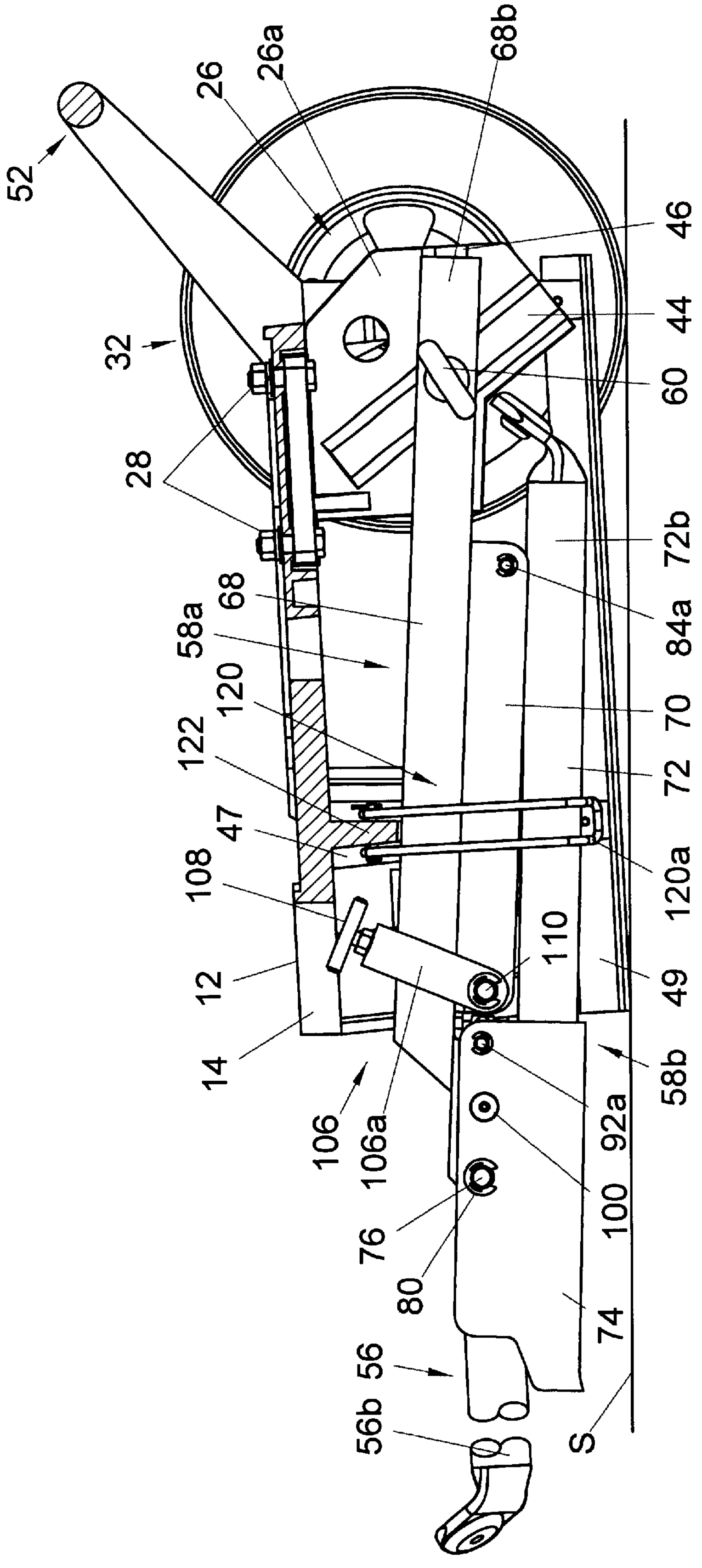
FIG. 5 is a sectional elevation view of the cart and stand taken along line 5—5 in FIG. 4.

The cart and stand further includes first, second and third legs 54, 56 and 58, respectively, which are respectively interengaged with the first, second and third leg supports as described hereinafter to selectively orient the legs in first and second positions relative to base 10. In the first position the legs and plate 12 provide a tripod for supporting plate 12 in a use position spaced above an underlying surface S as shown in FIGS. 1 and 2. In the second position, third leg 58 is collapsed and stored relative to the base as described more fully hereinafter so that wheels 32 can engage underlying surface S, and first and second legs 54 and 56 are positioned to provide handles extending forwardly of the base as shown in FIGS. 3–5 to provide a cart by which the base and thus machine M thereon can be pushed or pulled from one location to another. More particularly, each of the legs 54 and 56 is preferably a steel tube having corresponding upper ends 54*a* and 56*a* and corresponding lower ends 54*b* and 56*b*, the latter of which are preferably flattened and bent relative to the axis of the corresponding leg to provide feet for engaging surface S in the stand configuration of the assembly. Upper ends 54*a* and 56*a* of the first and second legs are adapted to be selectively received in one or the other of the recesses 40 and 42 in the corresponding leg support when the legs are respectively in the first and second positions relative to plate 12. Each of the legs is adapted to be releasably held in the selected position by means of a corresponding anchoring member 60 in the form of a shouldered eyebolt. As will be appreciated from the showing in FIG. 6 with regard to third leg 58, each anchoring bolt 60 for the first and second legs 54 and 56 has a threaded shank 62 extending through an opening 64 therefor in the upper end of the corresponding one of the legs 54 and 56 and into threaded engagement with a threaded opening 66 through the corresponding one of leg supports 22 and 24 for the first and second legs at the juncture between recesses 40 and 42. Thus, it will be appreciated that in the first position of legs 54 and 56 upper ends 54*a* and 56*a* thereof are received in recesses 40 of the corresponding leg support and are held therein by tightening anchoring bolt 60 against the outer side of the leg. Then, each of the legs can be shifted from the first to the second position thereof by loosening the corresponding anchoring bolt and shifting ends 54*a* and 56*a* of the legs from recess 40 to recess 42 of the corresponding leg support and then again tightening anchoring bolt 60 against the outer side of the corresponding leg.

Figure 6:
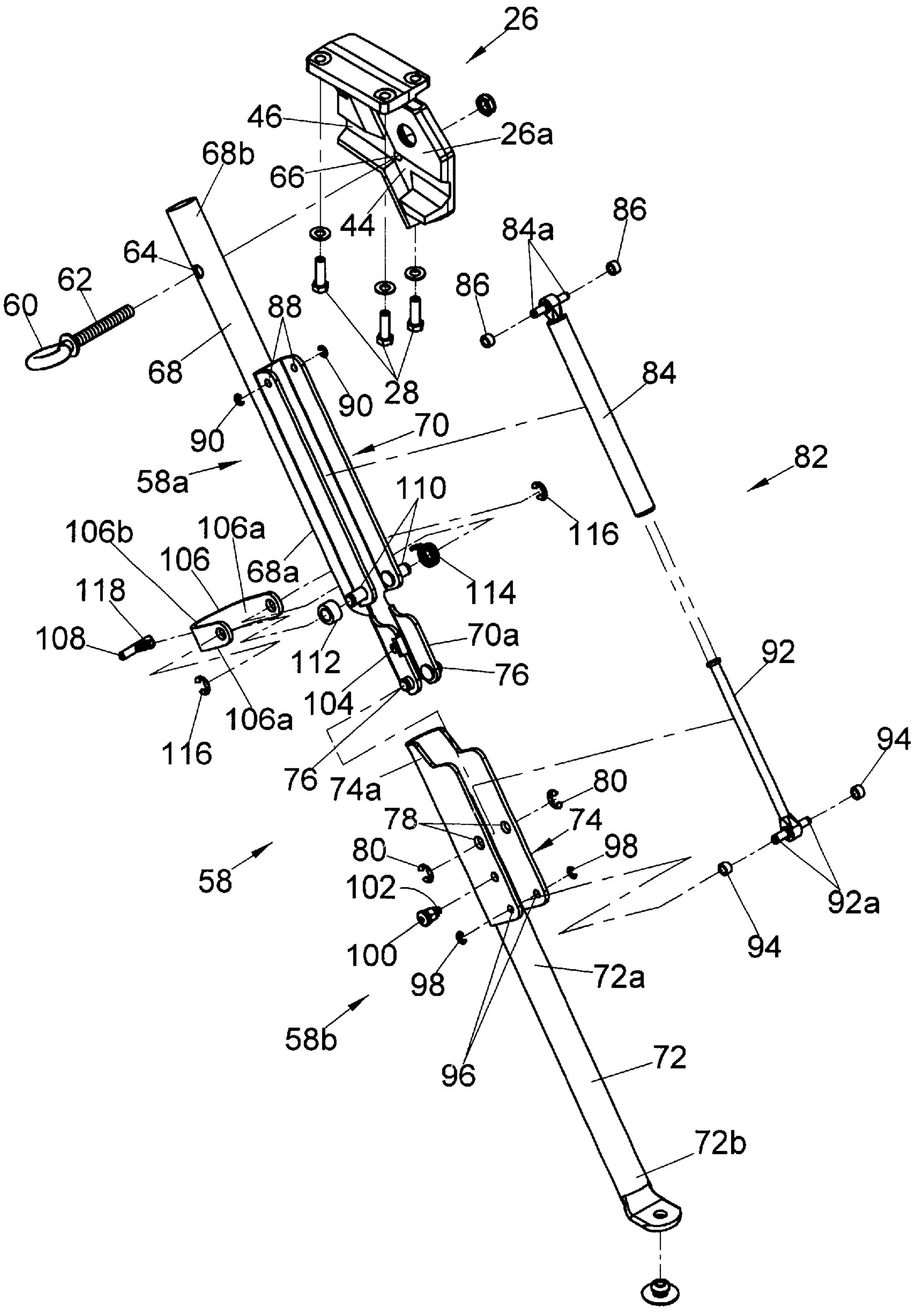
FIG. 6 is an exploded perspective view of the extendable and collapsible leg of the cart and stand; and, FIGS. 7–11 sequentially illustrate relative positions of the component parts of the cart and stand during displacement thereof from the cart to the stand configuration.

Third leg 58 is comprised of upper and lower leg members 58*a* and 58*b*, respectively, which are pivotally interconnected at the inner ends thereof as described more fully hereinafter for displacement between extended and collapsed positions relative to one another as respectively shown in FIGS. 2 and 5 of the drawing. As best seen in FIG. 6, upper member 58*a* includes a tubular steel leg element 68 and a U-shaped steel bracket member 70 suitably secured to the outer side of inner end 68*a* thereof, such as by welding, and lower leg member 58*b* includes a tubular steel leg element 72 and a U-shaped steel bracket member 74 receiving inner end 72*a* of element 72 and secured thereto, such as by welding. The outer end 72*b* of leg element 72 is flattened and bent outwardly of the axis of the tube to provide a foot for engaging underlying surface S when leg 58 is in the extended position and in its first position relative to plate 12. As will be appreciated from the foregoing description of the mounting of the first and second legs on the corresponding leg supports of the base, in the first position of third leg 58 relative to plate 12 the outer end 68*b* of tubular leg element 68 is received in channel 44 of third leg support 26 and is releasably held therein by an anchoring member 60 which has a threaded shank 62 extending through an opening 64 therefor in leg member 68 for threaded interengagement with an opening 66 through leg support 26 at the juncture between channels 44 and 46 thereof. By loosening anchoring bolt 60, the third leg can be pivoted around the threaded shank so as to be received in channel 46 of leg support 26 after which the anchoring bolt can be tightened to releasably hold the third leg in the second position thereof relative to base 10 and in which the third leg is collapsed and stored as will become apparent hereinafter.

Referring again to FIG. 6 of the drawing, inner end 70*a* of bracket 70 is received in bracket 74, and the inner ends of leg members 58*a* and 58*b* are provided by the brackets and are pivotally interconnected by means of pins 76 which extend outwardly from opposite sides of end 70*a* of bracket 70 through openings 78 provided therefor in bracket 74. Pins 76 are retained in openings 78 by corresponding spring clips 80 engaging in recesses therefor in the axially outer ends of pins 76. Pins 76 provide for leg members 58*a* and 58*b* to be pivotal between an unfolded condition shown in FIG. 2 and a folded condition shown in FIG. 5 and in which the leg members are in overlying relationship with outer ends 68*b* and 72*b* thereof adjacent one another. An air spring 82 is provided for biasing leg members 58*a* and 58*b* from the collapsed or folded to the extended or unfolded position thereof and, for this purpose, the air spring is disposed in the channel provided by U-shaped brackets 70 and 74. Pins 84*a* on the outer end of cylinder 84 of the spring receive spacers 86 and extend through openings 88 in bracket 70 and are secured to the latter by corresponding spring clips 90. Pins 92*a* on the outer end of piston rod 92 of the spring receive spacers 94 and extend through openings 96 in bracket 74 and are secured to the latter by corresponding spring clips 98. A spring biased locking pin 100 is mounted on bracket 74 and has an inner end 102 biased to extend inwardly through an opening 104 therefor in bracket 70 when the leg members are in the folded condition thereof shown in FIG. 5. Pin 100 releasably holds the leg members in the folded condition and is pulled outwardly to release the legs for unfolding displacement to the extended position.

A U-shaped swivel bracket 106 is pivotally mounted on bracket 70 and carries an anchoring member 108 for engaging end 74*a* of bracket 74 to hold the leg members 58*a* and 58*b* against pivotal displacement relative to one another when the leg members are in the unfolded condition thereof shown in FIG. 2. More particularly in this respect, bracket 70 has pins 110, one of which receives a spacer 112 and the other a torsion spring 114 and the pins also receive apertured legs 106*a* of bracket 106 which are retained relative to bracket 70 by spring clips 116 on the outer ends of the pins. Anchoring member 108 is a shouldered eyebolt and has a threaded shank 118 received in a threaded opening therefor in bridging portion 106*b* of bracket 106. When leg members 58*a* and 58*b* are in the extended condition end 74*a* of bracket 74 underlies bridging portion 106*b* of swivel bracket 106 and is adapted to be engaged by the inner end of shank 118 to preclude relative pivotal displacement between the leg members. Spring 114 normally biases bracket 106 to the position shown in FIG. 5 so as to provide clearance for end 74*a* of bracket 74 to move into position under the swivel bracket when the leg members are displaced to the extended condition. Then the swivel bracket is displaced against the bias of spring 114 to the position shown in FIG. 2 in which the bracket is perpendicular to the leg members and anchoring member 108 is rotated for the inner end of shank 118 to engage bracket end 74*a* to releasably hold the leg members in the unfolded condition.

The leg members are adapted to be displaced from the extended to the collapsed position by rotating anchoring member 108 to displace the inner end of shank 118 away from bracket end 74*a* whereupon bracket 106 is biased to the position shown in FIG. 5 to enable pivotal displacement between the leg members. The leg members are then folded against the bias of air spring 82 into overlying relationship relative to one another, as shown in FIG. 5, and when the leg members are fully collapsed end 102 of locking pin 100 enters opening 104 in bracket 70 to releasably hold the leg members in the collapsed position. Accordingly, it will be appreciated that the leg members are displaceable from the collapsed to the extended position by pulling locking pin 100 sufficiently for end 102 thereof to clear opening 104 whereupon air spring 82 biases the leg members to unfold to the extended position thereof. In the position shown in FIG. 5, third leg 58 is in a storage position beneath plate 12 of base 10 and is releasably held in the storage position in part by a downwardly extending wire retaining component 120 which is mounted beneath plate 12 on a laterally extending bridging portion 122 of the base which is integral with and extends between the upper ends of skid supports 47. Retainer 120 has an upwardly open U-shaped cradle 120*a* at its lower end which receives tube 72 when leg 58 is in the stored position. As will be appreciated from FIG. 5, when leg 58 is collapsed and stored beneath plate 12 upper end 68*b* of tubular leg member 68 thereof engages in second recess 46 of leg support 26 and anchoring bolt 60 associated therewith is tightened to hold the third leg in place in the recess. In the storage position, the third leg extends in the direction from rear end 16 of plate 12 toward front end 14 thereof and the intermediate portion of the third leg as defined by brackets 70 and 74 extends slightly forwardly of front end 14 of the plate.

Figure 7:
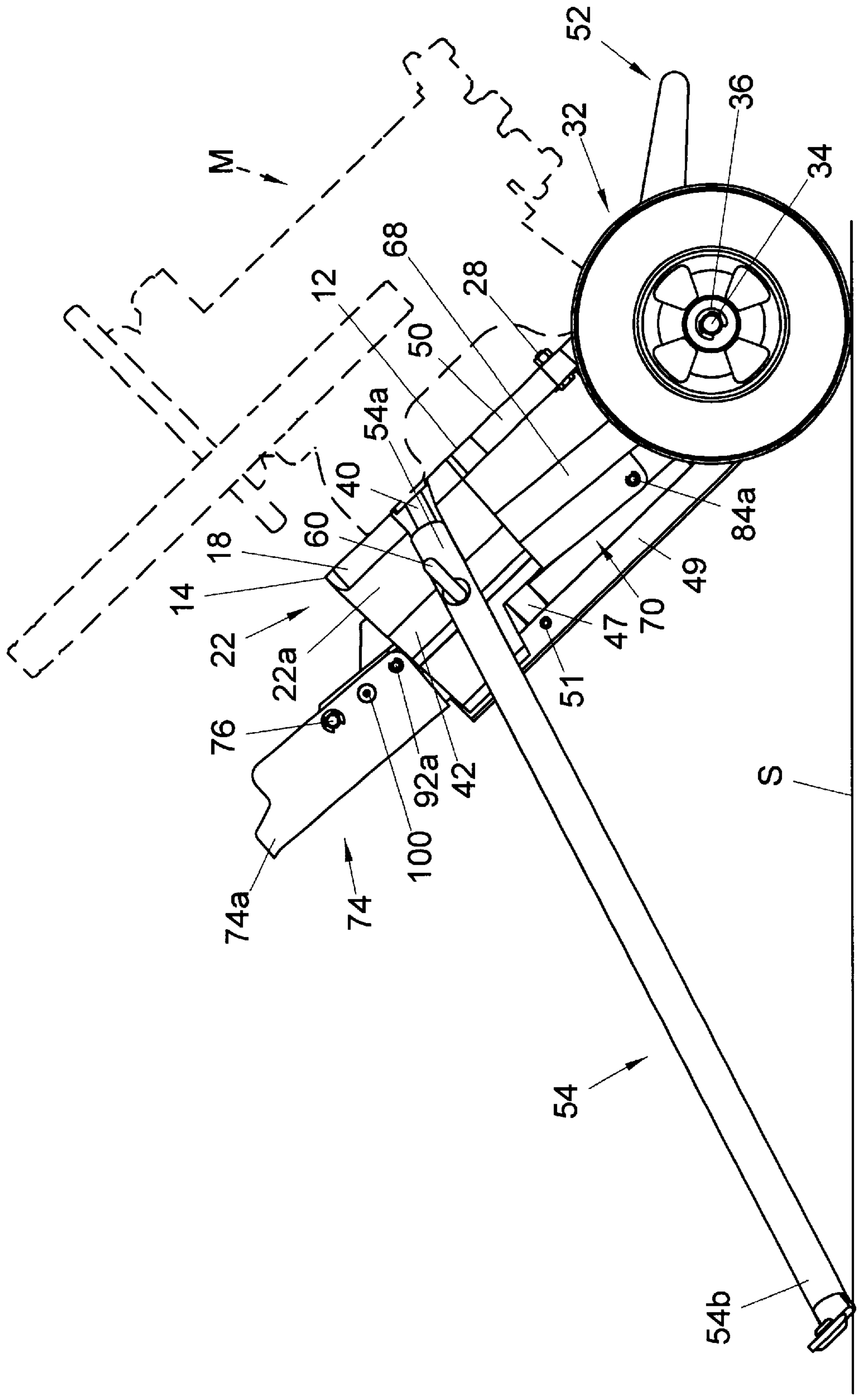
Figure 8:
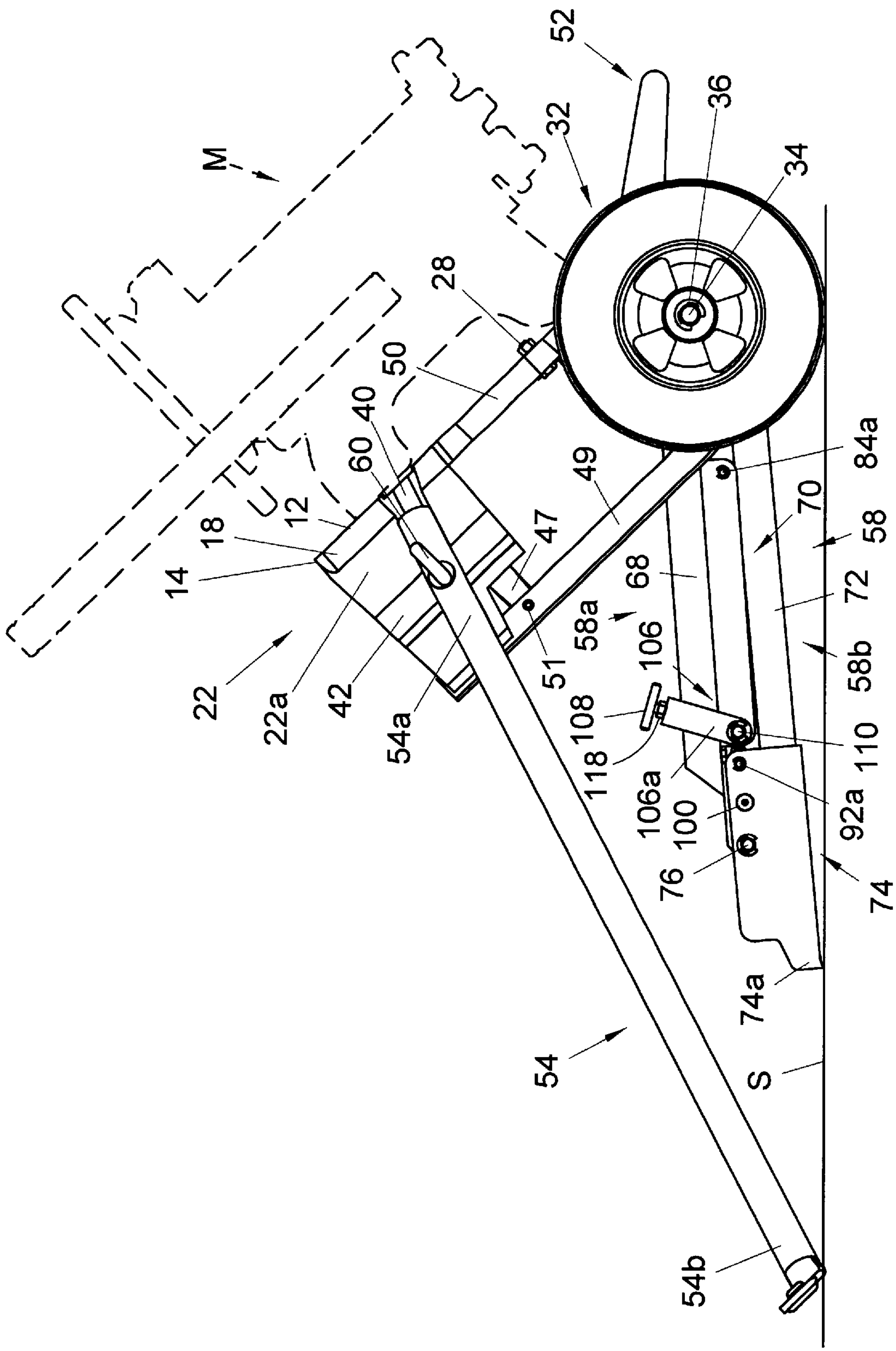
Figure 9:
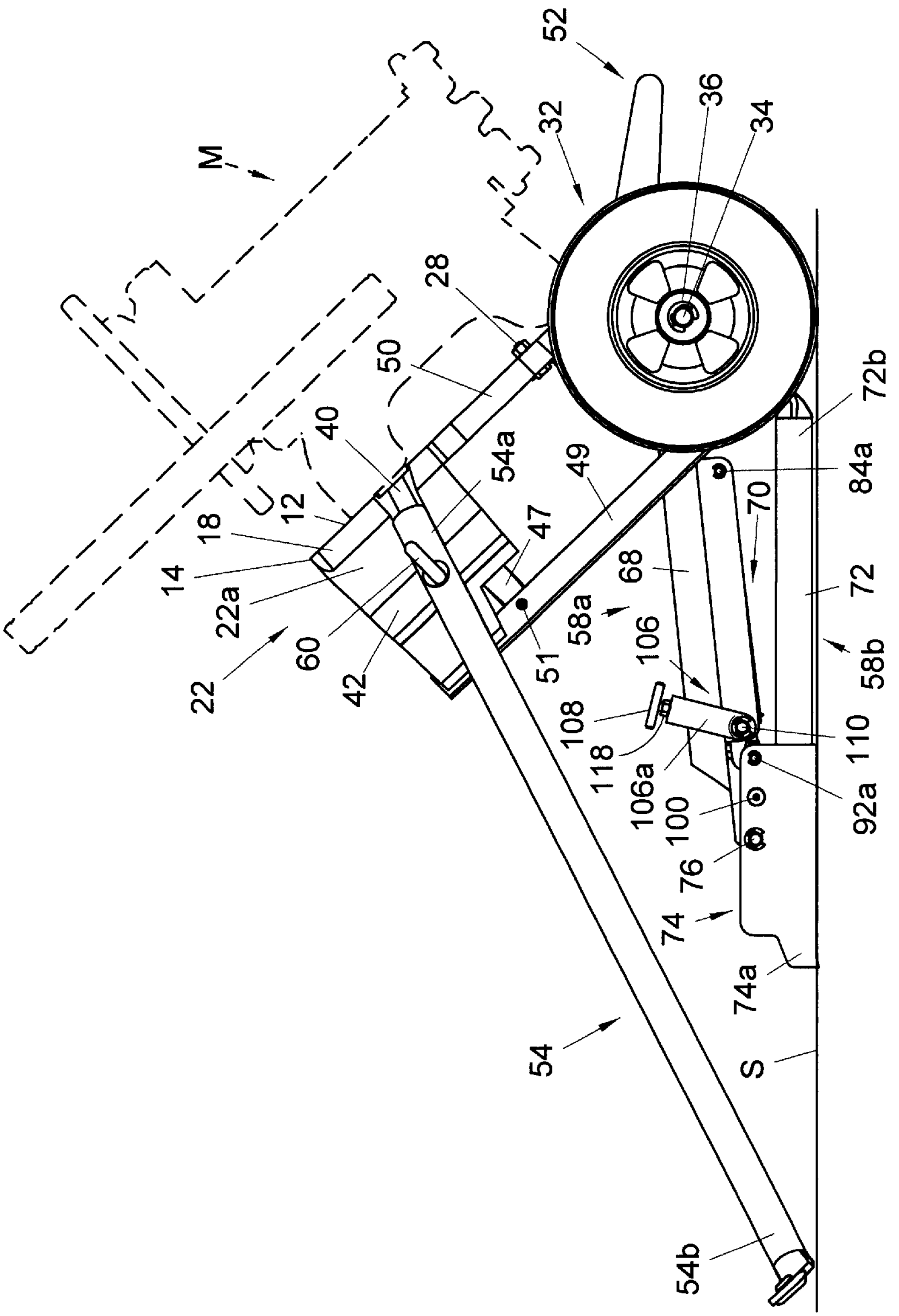
Figure 10:
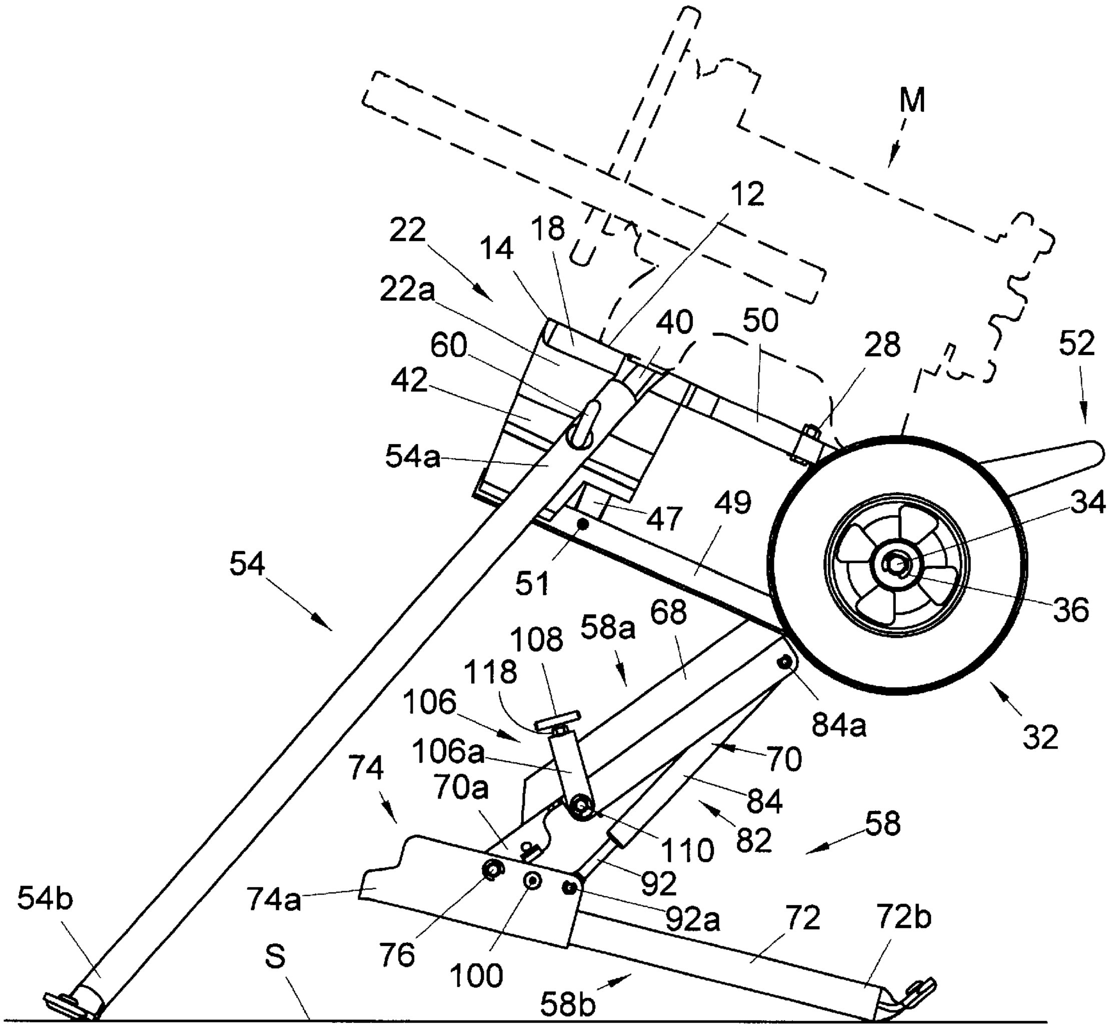
Figure 11:
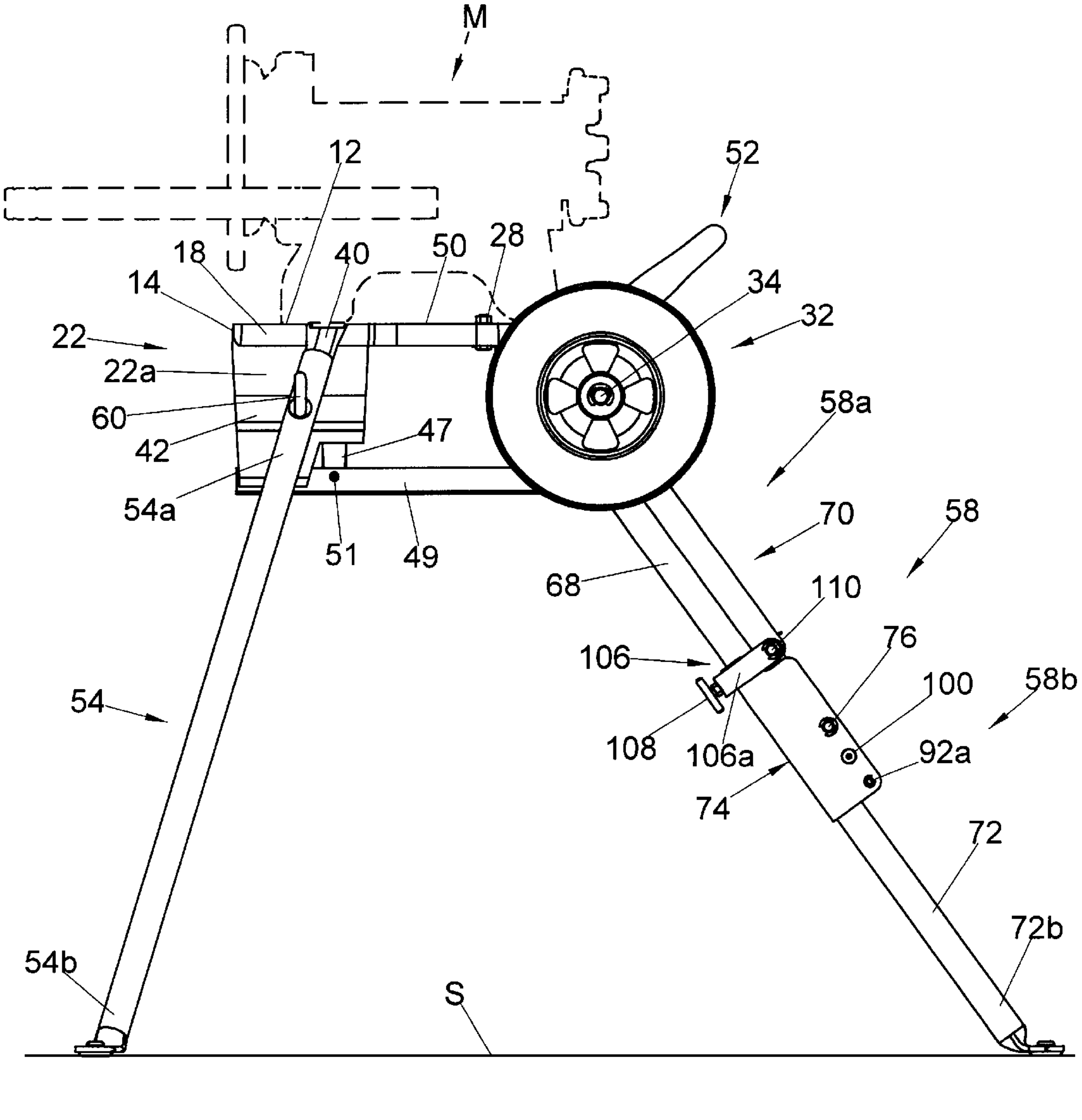

In use, presuming the cart and stand to initially be in the cart configuration as shown in FIGS. 3, 4 and 5, it will be appreciated that wheels 32 and skids 49 engage underlying surface S and support plate 12 and thus a machine M mounted thereon above the underlying surface. In the cart configuration, legs 54 and 56 are secured in recesses 42 of their leg supports by anchoring bolts 60 and extend parallel to one another and to the plane and sides 18 and 20 of plate 12. Moreover, legs 54 and 56 extend forwardly of front end 14 of plate 12 to provide handles by which the plate and machine M can be inclined relative to surface S about the axes of wheels 32 for pushing or pulling plate 12 and thus machine M from one location to another. When the cart and stand has been moved to a location in which the machine is to be used, the cart is converted to the stand configuration for supporting machine M above surface S in the following manner. First, the cart is pivoted clockwise about the wheel axes from the position shown in FIG. 3 to a position in which the outer end of support and handle component 52 engages surface S, whereby the cart is supported in an upright position by the wheels and support component 52. Then anchoring bolts 60 on first and second leg supports 22 and 24 are loosened to enable the shifting of leg portions 54*a* and 56*a* of first and second legs 54 and 56 from recesses 42 to recesses 40 of the leg supports, whereupon anchoring bolts 60 are tightened to retain the first and second legs in the corresponding recess 40. Then, the cart is pivoted counter clockwise about the wheel axes to engage the lower ends of legs 54 and 56 with surface S, as shown in FIG. 7. Then, anchoring bolt 60 associated with third leg support 26 is loosened to free upper end 68*b* of third leg 58 from channel 46, and tubular leg member 72 is released from retaining component 120 whereupon the third leg, which is still in the collapsed condition, drops to the position shown in FIG. 8. Locking pin 100 is then pulled to release the leg members 58*a* and 58*b* for pivotal displacement relative to one another which, initially, is from the folded position to the position shown in FIG. 9. Then, as plate 12 and machine M are progressively elevated through the use of handle and support component 52, leg members 58*a* and 58*b* are biased by air spring 82 to the extended position thereof as shown in FIGS. 10 and 11. In the extended position, the third leg is pivoted to move upper portion 68*b* thereof into channel 44 of leg support 26 whereupon anchoring bolt 60 is tightened to retain the third leg in channel 44. Swivel bracket 106 is then positioned perpendicular to bracket 74 and tightened to lock the leg members in the unfolded condition thereof.

When it is desired to return the cart and stand to the cart configuration, swivel bracket 106 is loosened to release leg members 58*a* and 58*b* for folding displacement relative to one another, the user stabilizes leg 58 such as by putting a foot on the lower end thereof and then pulls on handle 52 and pushes downwardly against the leg members at the juncture therebetween to initiate the pivotal displacement therebetween. At this point, upper end 68*a* of leg member 68 is still retained in recess 44 of leg support 26. The stand and machine M are then progressively lowered as the leg members move towards the collapsed condition thereof against the resistance of air spring 82. When the leg members are in the collapsed condition, locking pin 100 engages in opening 104 in bracket 70 to releasably lock the leg members in the collapsed condition, anchoring bolt 60 associated with leg support 26 is loosened, whereupon the collapsed leg is pivoted for upper end 68*b* thereof to enter recess 46 and tubular leg member 72 is releasably received in retainer clip 120. Anchoring bolt 60 is then tightened whereby the third leg is releasably retained in its stored position and the cart is in the disposition shown in FIG. 7 of a drawing. The cart is then pivoted clockwise about the axes at wheels 32 for the latter and the outer end of handle and support component 52 to engage surface S and support the stand in the upright disposition thereof, whereupon anchoring bolts 60 associated with leg supports 22 and 24 are loosened for ends 54*a* and 56*a* legs 54 and 56 to be repositioned in the corresponding recess 42 in which the latter legs provide handles for the cart upon the tightening of anchoring bolts 60 relative thereto. The cart can then be pivoted counterclockwise about the axes of wheel 32 and supported by legs 54 and 56 as handles for wheeled transport of machine M along underlying surface S. In the cart configuration, skid bars 49 facilitate transporting the cart and machine up and down stairs or the like, and handles 50 on the laterally opposite sides of plate 12 of base 10 facilitate picking the cart and machine M thereon up for loading relative to a truck or the like.

While considerable emphasis has been placed herein on the structures of and the structural interrelationships between the component parts of a preferred embodiment of the invention, it will be appreciated that other embodiments of the invention can be devised and that many changes can be made in the preferred embodiment without departing from the principles of the invention. In particular in this respect, it will be appreciated that the third leg could be collapsible other than by pivoting component parts thereof and, for example, could be extendable and collapsible through a telescoping arrangement between the leg portions. Further, in the latter as well as in the embodiment disclosed, a biasing spring other than an air spring could be used to bias the leg portions from the collapsed toward the extended condition thereof. Still further, while it is preferred that the third leg be collapsible to facilitate conversion of the assembly between the cart and stand configurations thereof, it will be appreciated that the third leg could be non-collapsible in which case the third leg in the stored position thereof would underlie plate 12 and extend forwardly of front end 14 thereof a distance less than the first and second legs which accordingly would still provide handles for the cart. Likewise, the third leg in the preferred embodiment could be so stored in the extended condition thereof. These and other modifications of the preferred embodiment as well as other embodiments of the invention will be suggested and obvious to those skilled in the art from the disclosure herein, whereby it is to be distinctly understood that the foregoing descriptive matter is to be interpreted merely as illustrative of the invention and not as a limitation.

Having thus described the invention, it is so claimed:

1. A cart and stand for supporting metal working apparatus comprising a base, a pair of wheels directly mounted on said base for supporting said base for rolling movement along an underlying surface, first, second and third legs each having first and second ends, said first ends being interconnected with said base for displacement of the corresponding leg between first and second positions relative to said base, said first, second and third legs in said first position providing a tripod with said base for said second ends of said legs to engage an underlying surface and support said base in a position spaced above the underlying surface, said first and second legs in said second position providing handles and said third leg in said second position being stored relative to said base for said pair of wheels to engage the underlying surface, whereby said base can be inclined relative to the underlying surface by lifting said handles and supported by said wheels for rolling movement along the surface.

2. A cart and stand according to claim 1, wherein said base has opposite ends, said wheels and said third leg being on one of said ends and said first and second legs being on the other of said ends.

3. A cart and stand according to claim 2, wherein said first and second legs in said second position thereof extend outwardly of said other of said ends and said third leg in said second position thereof extends from said one end toward said other end.

4. A cart and stand according to claim 1, wherein said third leg comprises first and second leg members having outer and inner ends, and means interconnecting said inner ends for said leg members to be displaceable relative to one another between extended and collapsed positions.

5. A cart and stand according to claim 4, and means for releasably holding said leg members in said collapsed position.

6. A cart and stand comprising a base for supporting metal working apparatus, a pair of wheels on said base for supporting said base for rolling movement along an underlying surface, first, second and third legs each having first and second ends, said first ends being interconnected with said base for displacement of the corresponding leg between first and second positions relative to said base, said first, second and third legs in said first position providing a tripod with said base for said second ends of said legs to engage an underlying surface and support said base in a position spaced above the underlying surface, said first and second legs in said second position providing handles and said third leg in said second position being stored relative to said base for said pair of wheels to engage the underlying surface, whereby said base can be inclined relative to the underlying surface by lifting said handles and supported by said wheels for rolling movement along the surface, said third leg comprising first and second leg members having outer and inner ends, means interconnecting said inner ends for said leg members to be displaceable relative to one another between extended and collapsed positions, means for releasably holding said leg members in said collapsed position, and means for biasing said leg members from said collapsed position toward said extended position.

7. A cart and stand according to claim 6, and means to releasably hold said leg members in said extended position.

8. A cart and stand comprising a base for supporting metal working apparatus, a pair of wheels on said base for supporting said base for rolling movement along an underlying surface, first, second and third legs each having first and second ends, said first ends being interconnected with said base for displacement of the corresponding leg between first and second positions relative to said base, said first, second and third legs in said first position providing a tripod with said base for said second ends of said legs to engage an underlying surface and support said base in a position spaced above the underlying surface, said first and second legs in said second position providing handles and said third leg in said second position being stored relative to said base for said pair of wheels to engage the underlying surface, whereby said base can be inclined relative to the underlying surface by lifting said handles and supported by said wheels for rolling movement along the surface, said third leg comprising first and second leg members having outer and inner ends, and means interconnecting said inner ends for said leg members to be displaceable relative to one another between extended and collapsed positions, said means interconnecting said inner ends of said leg members including means interconnecting said inner ends for pivotal displacement of said leg members between folded and unfolded conditions respectively providing said collapsed and said extended positions.

9. A cart and stand according to claim 8, and first and second means for respectively holding said leg members in said folded condition and said unfolded condition.

10. A cart and stand according to claim 8, and biasing means for biasing said leg members from said folded toward said unfolded condition.

11. A cart and stand according to claim 10, wherein said biasing means includes spring means.

12. A cart and stand according to claim 11, wherein said spring means includes a gas spring.

13. A cart and stand according to claim 8, wherein said base has opposite ends, said wheels and said third leg being on one of said ends and said first and second legs being on the other of said ends.

14. A cart and stand according to claim 13, wherein said first and second legs in said second position thereof extend outwardly of said other of said ends and said third leg in said second position thereof extends from said one end toward said other end.

15. A cart and stand according to claim 14, and first and second means for respectively holding said leg members in said folded condition and said unfolded condition.

16. A cart and stand according to claim 15, and spring means for biasing said leg members from said folded toward said unfolded condition.

17. A cart and stand according to claim 16, wherein said outer end of said first leg member is said first end of said third leg and said outer end of said second leg member is said second end of said third leg, whereby said outer ends of said leg members are adjacent said one end of said stand when said leg members are in said folded condition and said third leg is in said second position thereof.

18. A cart and stand according to claim 17, wherein said first ends of said first, second and third legs and said base include means interengaging to support said first, second and third legs in each of said first and second positions thereof.

19. A cart and stand according to claim 18, wherein said means interengaging said base and said legs includes means respectively releasably holding said first, second and third legs in each of said first and second positions thereof.

20. A cart and stand according to claim 19, wherein said first ends of said first, second and third legs are tubular and said base includes a pair of recesses for the first end of each leg, each recess of said pair interengaging with the first end of the corresponding leg to support the corresponding leg in a different one of the first and second positions thereof.

21. A cart and stand for supporting metal working apparatus comprising a base, said base comprising a plate having front and rear ends and laterally opposite sides between said ends, first and second leg supports each depending from said plate adjacent said front end and a different one of said opposite sides, a third leg support depending from said plate adjacent said rear end and intermediate said opposite sides, a pair of wheel supports each depending from said plate adjacent said rear end and a different one of said opposite sides, a wheel directly mounted on each wheel support for rotation about an axis extending in the direction between said opposite sides, first, second and third legs, said first, second and third leg supports including means interengaging with said first, second and third legs respectively for selectively supporting said first, second and third legs in first and second positions relative to said plate, each of said legs in said first position extending downwardly from said plate for supporting the base above an underlying surface, said first and second legs in said second position thereof each extending forwardly of said front end of said plate, and said third leg in said second position thereof extending forwardly from said rear end of said plate between said wheels, whereby said wheels can engage the underlying surface and said plate can be inclined relative to the underlying surface and supported by said wheels for rolling movement therealong.

22. A cart and stand according to claim 21, wherein said first and second legs in said first position are inclined laterally outwardly of the corresponding side of said plate and forwardly of the front end of the plate and said third leg in said first position thereof is inclined rearwardly of the rear end of the plate.

23. A cart and stand according to claim 21, wherein said base includes first and second skid supports depending therefrom laterally inwardly of said first and second leg supports, respectively, each said first and second skid support and each said first and second wheel support having a lower end, and a skid rail extending between the lower ends of the skid support and wheel support on each of said laterally opposite sides of said plate.

24. A cart and stand according to claim 21, wherein said third leg comprises first and second leg members having outer and inner ends, and means interconnecting said inner ends for said leg members to be displaceable relative to one another between extended and collapsed positions.

25. A cart and stand according to claim 24, and means for releasably holding said leg members in said collapsed position.

26. A cart and stand comprising a base for supporting metal working apparatus, said base comprising a plate having front and rear ends and laterally opposite sides between said ends, first and second leg supports each depending from said plate adjacent said front end and a different one of said opposite sides, a third leg support depending from said plate adjacent said rear end and intermediate said opposite sides, a pair of wheel supports each depending from said plate adjacent said rear end and a different one of said opposite sides, a wheel supported on each wheel support for rotation about an axis extending in the direction between said opposite sides, first, second and third leg supports, and third leg supports including means interengaging with said first, second and third legs respectively for selectively supporting said first, second and third legs in first and second positions relative to said plate, each of said legs in said first position extending downwardly from said plate for supporting the base above an underlying surface, said first and second legs in said second position thereof each extending forwardly of said front end of said plate, and said third leg in said second position thereof extending forwardly from said rear end of said plate between said wheels, whereby said wheels can engage the underlying surface and said plate can be inclined relative to the underlying surface and supported by said wheels for rolling movement therealong, said means interengaging with said first, second and third legs including first and second recesses on each said first, second and third leg supports respectively extending downwardly relative to said plate and generally parallel to said plate.

27. A cart and stand according to claim 26, wherein said second recesses in said first and second leg supports extend parallel to said opposite sides of said plate.

28. A cart and stand according to claim 26, wherein each said first, second and third leg includes a tubular portion for interengaging with the first and second recesses of the corresponding leg support.

29. A cart and stand according to claim 26, wherein said first and second recesses in each said first, second and third leg supports intersect one another, and a threaded fastener for extending through the corresponding leg and a threaded opening in the corresponding leg support at the intersection between the first and second recesses therein for releasably holding said corresponding leg selectively in each of said first and second recesses.

30. A cart and stand according to claim 29, wherein said first and second legs in said first position are inclined laterally outwardly of the corresponding side of said plate and forwardly of the front end of the plate and said third leg in said first position thereof is inclined rearwardly of the rear end of the plate.

31. A cart and stand according to claim 30, wherein said second recesses in said first and second leg supports extend parallel to said opposite sides of said plate.

32. A cart and stand comprising a base for supporting metal working apparatus, said base comprising a plate having front and rear ends and laterally opposite sides between said ends, first and second leg supports each depending from said plate adjacent said front end and a different one of said opposite sides, a third leg support depending from said plate adjacent said rear end and intermediate said opposite sides, a pair of wheel supports each depending from said plate adjacent said rear end and a different one of said opposite sides, a wheel supported on each wheel support for rotation about an axis extending in the direction between said opposite sides, first, second and third leg supports, said first, second and third leg supports including means interengaging with said first, second and third legs respectively for selectively supporting said first, second and third legs in first and second positions relative to said plate, each of said legs in said first position extending downwardly from said plate for supporting the base above an underlying surface, said first and second legs in said second position thereof each extending forwardly of said front end of said plate, said third leg in said second position thereof extending forwardly from said rear end of said plate between said wheels, whereby said wheels can engage the underlying surface and said plate can be inclined relative to the underlying surface and supported by said wheels for rolling movement therealong, said third leg comprising first and second leg members having outer and inner ends, means interconnecting said inner ends for said leg members to be displaceable relative to one another between extended and collapsed positions, means for releasably holding said leg members in said collapsed position, and means for biasing said leg members from said collapsed position toward said extended position.

33. A cart and stand according to claim 32, and means to releasably hold said leg members in said extended position.

34. A cart and stand comprising a base for supporting metal working apparatus, said base comprising a plate having front and rear ends and laterally opposite sides between said ends, first and second leg supports each depending from said plate adjacent said front end and a different one of said opposite sides, a third leg support depending from said plate adjacent said rear end and intermediate said opposite sides, a pair of wheel supports each depending from said plate adjacent said rear end and a different one of said opposite sides, a wheel supported on each wheel support for rotation about an axis extending in the direction between said opposite sides, first, second and third legs, said first, second and third leg supports including means interengaging with said first, second and third legs respectively for selectively supporting said first, second and third legs in first and second positions relative to said plate, each of said legs in said first position extending downwardly from said plate for supporting the base above an underlying surface, said first and second legs in said second position thereof each extending forwardly of said front end of said plate, said third leg in said second position thereof extending forwardly from said rear end of said plate between said wheels, whereby said wheels can engage the underlying surface and said plate can be inclined relative to the underlying surface and supported by said wheels for rolling movement therealong, said third leg comprising first and second leg members having outer and inner ends, and means interconnecting said inner ends for said leg members to be displaceable relative to one another between extended and collapsed positions, said means interconnecting said inner ends of said leg members including means interconnecting said inner ends for pivotal displacement of said leg members between folded and unfolded conditions respectively providing said collapsed and said extended positions.

35. A cart and stand according to claim 34, and first and second means for respectively holding said leg members in said folded condition and said unfolded condition.

36. A cart and stand according to claim 34, and biasing means for biasing said leg members from said folded toward said unfolded condition.

37. A cart and stand according to claim 36, wherein said biasing means includes a gas spring.

38. A cart and stand according to claim 36, wherein said first and second legs in said first position are inclined laterally outwardly of the corresponding side of said plate and forwardly of the front end of the plate and said third leg in said first position thereof is inclined rearwardly of the rear end of the plate.

39. A cart and stand according to claim 38, wherein said means interengaging with said first, second and third legs includes first and second recesses in each said first, second and third leg supports respectively extending downwardly relative to said plate and generally parallel to said plate.

40. A cart and stand according to claim 39, wherein said second recesses in said first and second leg supports extend parallel to said opposite sides of said plate and wherein each said first, second and third leg includes a tubular portion for interengaging with the first and second recesses of the corresponding leg support.

41. A cart and stand according to claim 40, wherein said first and second legs in said first position are inclined laterally outwardly of the corresponding side of said plate and forwardly of the front end of the plate and said third leg in said first position thereof is inclined rearwardly of the rear end of the plate.

42. A cart and stand according to claim 41, wherein said base includes first and second skid supports depending therefrom laterally inwardly of said first and second leg supports, respectively, each said first and second skid support and each said first and second wheel support having a lower end, and a skid rail extending between the lower ends of the skid support and wheel support on each of said laterally opposite sides of said plate.

43. A cart and stand according to claim 42, wherein said biasing means includes a gas spring.

* * * * *

UNITED STATES PATENT AND TRADEMARK OFFICE

CERTIFICATE OF CORRECTION

PATENT NO. : 6,471,220 B1

DATED : October 29, 2002

INVENTOR(S) : Larry F. Babb

It is certified that error appears in the above-identified patent and that said Letters Patent is hereby corrected as shown below:

Column 12,
Line 6, delete “leg supports,” and insert therefor -- legs, said first, second --.

Signed and Sealed this

Fifteenth Day of April, 2003

JAMES E. ROGAN
*Director of the United States Patent and Trademark Office*